Figure 3A:
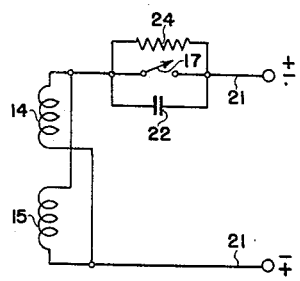

July 23, 1940. H. C. ROTERS 2,209,039
VARIABLE PERMEANCE ELECTRIC MOTOR
Filed June 11, 1938 2 Sheets-Sheet 1
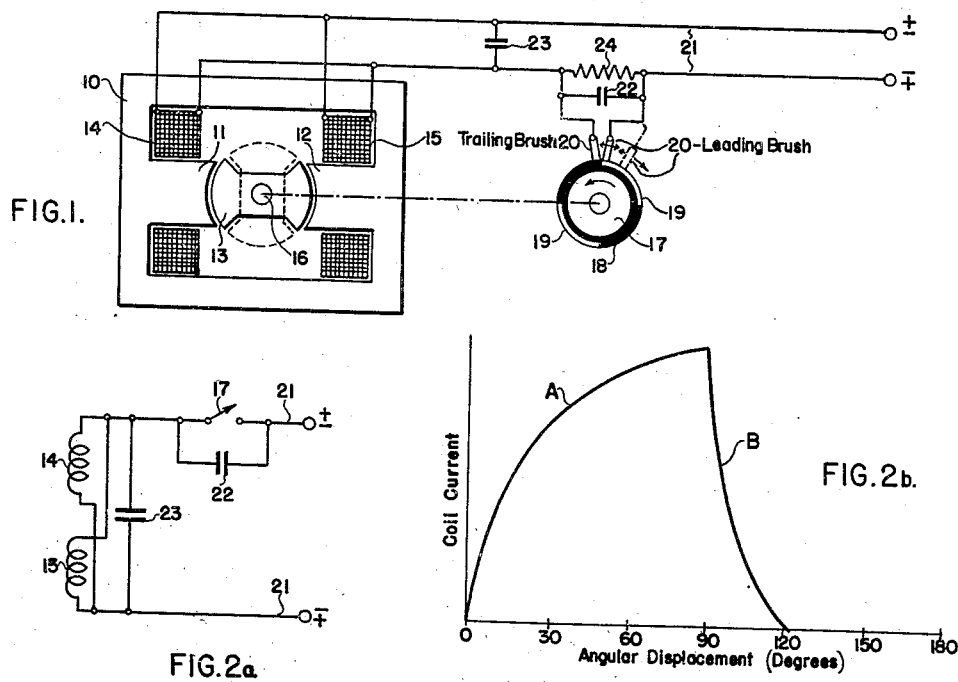
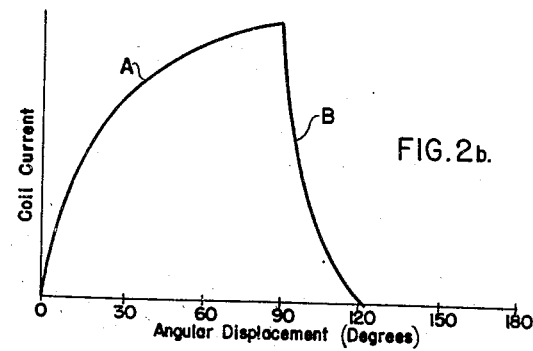
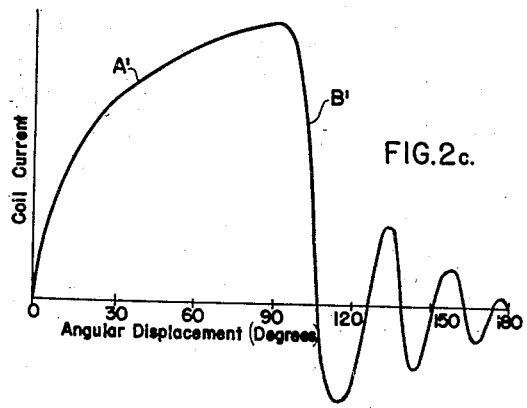
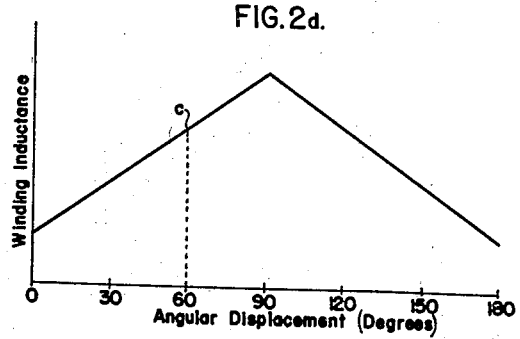
INVENTOR
HERBERT C. ROTERS
BY Laurence B. Dodds
ATTORNEY July 23, 1940.                    H. C. ROTERS                       2,209,039
                         VARIABLE PERMEANCE ELECTRIC MOTOR
                            Filed June 11, 1938            2 Sheets-Sheet 2

INVENTOR
HERBERT C. ROTERS
BY Laurence B Dodds
ATTORNEY

Patented July 23, 1940

2,209,039

UNITED STATES PATENT OFFICE 2,209,039

VARIABLE PERMEANCE ELECTRIC MOTOR

Herbert C. Roters, Hoboken, N. J., assignor to Casner Patents, Inc., a corporation of Delaware Application June 11, 1938, Serial No. 213,157

23 Claims. (Cl. 172—36)

This invention relates to variable permeance electric motors and is of general application to motors of a wide range of sizes varying from a few watts, such as used in electric razors, electric vibrators, and the like, to large motors used for power purposes.

This application is a continuation-in-part of applicant's earlier filed application, Serial No. 160,993, filed August 26, 1937, and entitled "Electro-magnetic engine or magnetic motor."

Variable permeance electric motors have been well known in the art for many years but have been used commercially only to a relatively minor extent and only in miniature sizes. In general, such motors comprise a magnetic core member provided with an exciting winding; a magnetic armature member relatively rotatable with respect to the core member and generally unexcited, that is, without an exciting winding; and a circuit interrupter actuated by relative rotation between said core member and said armature periodically to close the exciting circuit during those portions of each cycle of rotation in which the torque between the members is in the direction to aid rotation and to open the exciting circuit during the remaining portions, rotation being maintained during such periods by the angular momentum of the moving parts. Usually a condenser is connected across the circuit interrupter, while it has been proposed to connect a resistor across the motor windings, such means serving to reduce the arcing at the contacts of the interrupter and limit the induced voltage across the motor winding.

The arrangements of the prior art, however, have been subject to certain undesirable operating characteristics, which have restricted their field of usefulness, as stated above. For example, in the prior art motors of the type described, the energy stored in the magnetic field of the motor winding by each periodic excitation has been completely dissipated at each interruption of the motor circuit. This dissipation has resulted in serious arcing at the interrupter contacts, even though such arcing may be somewhat reduced by the use of appropriate by-pass condensers. It has also resulted in serious loss of efficiency, not only due to the actual loss of such dissipated energy, but due to the fact that the dissipation has taken the form of a flow of current in the motor winding during such portions of the cycle of rotation as to produce a negative torque between the motor elements, that is, an actual dynamic braking. This negative torque just described may, in certain motors and under certain operating conditions, cause the motor to run erratically or even stop, particularly since the duration of the current which produces it depends upon the arc at the contacts, which, in turn, is extremely variable with atmospheric conditions, the condition of the contacts, and other variables.

Other characteristics of the motors of the prior art also lower the obtainable horsepower output per pound weight, resulting in a relatively large, heavy, and costly motor for a given power output. For example, the power output per pound is lowered by reason of the fact that the motor winding has an appreciable time contact (L/R) so that current does not build up therein instantaneously upon closing the circuit interrupter. Hence, the average current during the working portion of each cycle is substantially less than its maximum value. Further, because of the fact that the time constant L/R of the motor winding becomes very great in the case of larger motors, such motors have not been practicable heretofore because their speed was too low or they required too high an operating voltage, or for both of these reasons.

It is an object of this invention, therefore, to provide a new and improved variable permeance electric motor which will overcome one or more of the above-mentioned disadvantages of such motors of the prior art and which has improved operating characteristics.

It is another object of the invention to provide a variable permeance electric motor which has one or more of the following desirable characteristics: increased operating efficiency, reducted arcing at the interrupter, increased power output per pound weight, and increased stability and smoothness of operation.

In accordance with one feature of the invention, there is provided a variable permeance electric motor comprising relatively rotatable salient pole magnetic core and armature members having relative positions of maximum and minimum permeance. The core member is provided with an exciting winding, while a circuit interrupter actuated by relative rotation between the core and armature members is effective periodically to open and close the circuit of the exciting winding, the circuit being opened a substantial interval before the core and armature members reach each relative position of maximum permeance. As a result, the energy stored in the magnetic field of the motor winding appears as a current which, from the time the circuit is opened until the members reach the relative position of maximum permeance, is effective to develop useful mechanical power. The expression "substantial interval before the position of maximum permeance," as applied to the opening of the circuit interrupter, is used hereinafter in the specification and claims to define an electrical phase interval of such value as is effective to cause the motor to utilize such a material portion of the energy stored in the magnetic field of its winding when its circuit is opened in developing mechanical work that the efficiency of the motor is materially improved with respect to its operation when its winding circuit is opened at the position of maximum permeance; specifically, the value of such substantial phase interval in the case of a two-pole motor is of the order of 30 mechanical degrees or more, and in certain instances may be as much as 60 mechanical degrees or more. In the case of a two-pole motor, the phase interval in electrical degrees is equal to twice the phase interval in mechanical degrees; in other motors the phase interval in electrical degrees is equal to the product of the phase interval in mechanical degrees and the number of poles, this relationship being due to the fact that the rotor is unpolarized. For the sake of clarity, all phase angles referred to hereinafter are in mechanical degrees. In accordance with another feature of the invention, there is preferably provided an uninterrupted discharge path for this current generated by the collapse of the motor field, independent of the circuit interrupter, to avoid the necessity of carrying this current through an arc at the interrupter. This discharge path is preferably designed with a resistance so related in value to the other constants of the motor as to provide optimum operating characteristics. The discharge resistance may be connected across the motor winding or across the circuit interrupter, but the latter connection imparts certain desirable operating characteristics to the motor. The discharge resistance may comprise a unilaterally conductive device to avoid the current drain on the supply circuit during the portions of the cycle when the discharge current is not flowing. In accordance with another feature of the invention, the value of the resistance of the discharge path is varied in a predetermined manner over each cycle of rotation to improve still further the operating characteristics of the motor.

For a better understanding of the invention, together with other and further objects thereof, reference is had to the following description taken in connection with the accompanying drawings, and its scope will be pointed out in the appended claims.

Figure 3B:
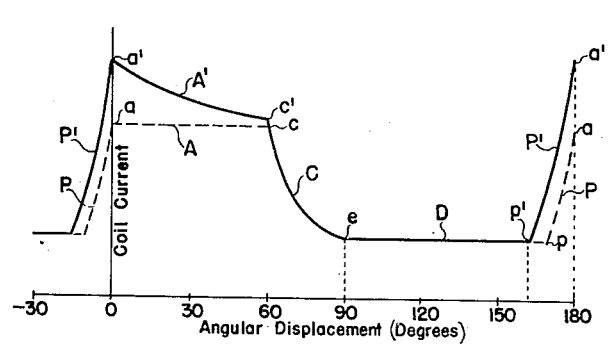
Figure 4A:
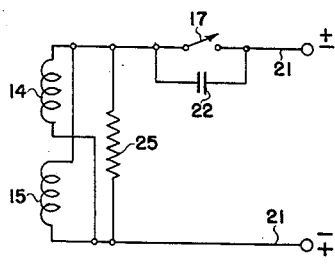
Figure 4B:
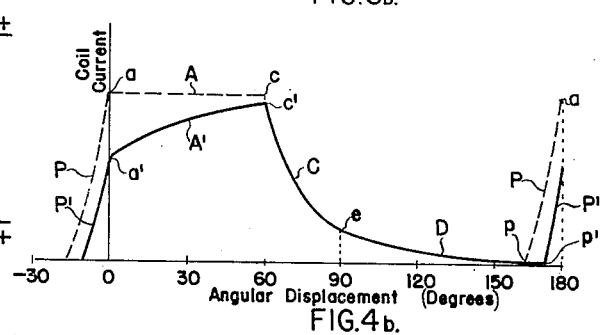
Figure 5A:
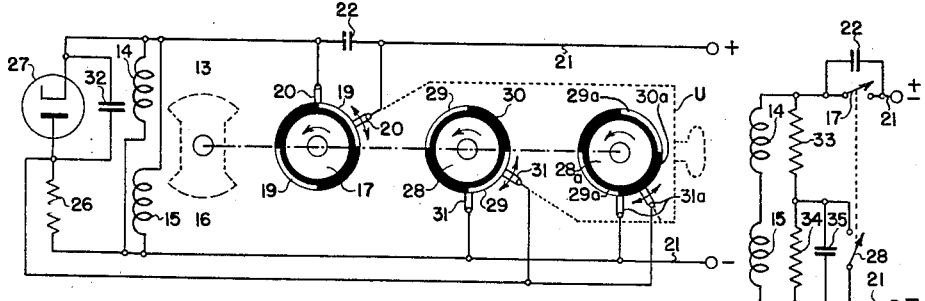
Figure 5C:
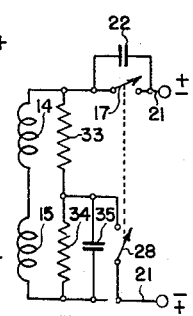
Figure 5B:
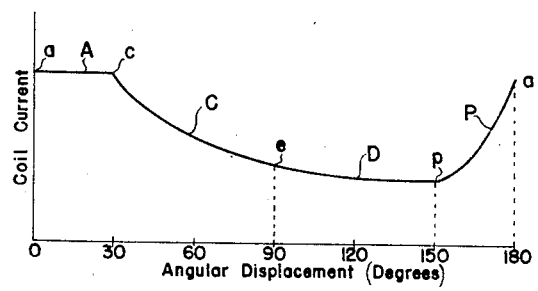
Figure 5D:
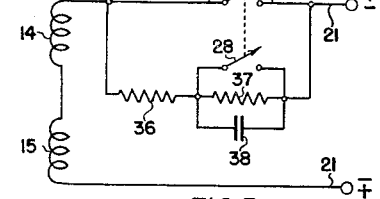

In the drawings, Fig. 1 is a diagrammatic representation, partly schematic, of a variable permeance motor embodying the invention; Fig. 2a is a simplified equivalent circuit diagram of the motor of Fig. 1 with the discharge resistor omitted; Figs. 2b, 2c, 2d are graphs representing certain operating characteristics of the motor of Fig. 1; Figs. 3a and 4a are simplified equivalent circuit diagrams of certain modified forms of the invention; Figs. 3b and 4b are graphs of operating characteristics of the motors of Figs. 3a and 4a, respectively; Fig. 5a is a simplified circuit diagram of another modified form of the invention; Fig. 5b is a graph of an operating characteristic of the motor of Fig. 5a; while Figs. 5c and 5d are simplified circuit diagrams of still further modified forms of the invention.

Referring now more particularly to Fig. 1 of the drawings, there is shown, partially schematically, a variable permeance electric motor including provisions for incorporating the present invention. The motor structure proper consists of a magnetic yoke 10, preferably constructed of suitable laminated material, having inwardly projecting salient pole pieces 11 and 12 forming a substantially cylindrical air gap in which is disposed a salient pole magnetic armature 13 having pole pieces with cylindrical faces complementary to the faces of the pole pieces to provide a substantially uniform air gap. Mounted on the poles 11 and 12 are a pair of windings 14 and 15 of any suitable type connected either in series or, as shown, in parallel. The rotating armature 13 is mounted on a shaft 16 on which is also mounted a circuit interrupter of any suitable type, for example, a segmental commutator 17. The commutator 17 comprises an insulating ring 18 on which are disposed two segmental conductive rings 19, each extending over an arc of approximately 90 degrees. Bearing on the commutator 17 are a pair of brushes 20 which are connected in series in the supply circuit 21 and, when electrically connected through one of the conducting segments 19, are effective to energize the windings 15 of the motor.

As thus far described, and neglecting the resistors and condensers shown, the foregoing apparatus comprises a conventional variable permeance electric motor of the prior art type. An understanding of the principles of operation of such apparatus may be best gained by reference to Fig. 2a, which is a simplified equivalent circuit diagram of the motor of Fig. 1, and to Fig. 2b, which illustrates an operating characteristic of such motor. Neglecting also the condensers shown in Fig. 2a and assuming the armature to occupy the position of minimum permeance shown in dotted lines in Fig. 1 and the commutator to occupy the position shown in full lines in Fig. 1 with the brushes 20 in substantial alignment, the circuit to the motor is just completed through the brushes 20 and the current begins to build up along the logarithmic curve A of Fig. 2b. Assuming that the armature is just beyond dead center or has a momentum in the counterclockwise direction of rotation, the current flowing in the windings 14 and 15 exerts a torque on the armature 13 urging it toward the position of maximum permeance shown in full lines in Fig. 1. At this point the circuit through the brushes 20 and the conducting segment 19 is broken and the momentum of the moving parts including the armature 13 carries it through the succeeding 90 degrees of rotation, at which point the circuit to the motor is again made through the brushes 20 and the successive conducting segment 19 of commutator 17 and the above-described cycle is repeated; that is, two positive torque impulses are imparted to the armature 13 during each complete cycle of rotation.

However, it will be noted that, after the first 90 degrees of rotation when the circuit is interrupted through the brushes 20, the coil current does not immediately fall to zero. This is due to the fact that an appreciable amount of energy is stored in the magnetic field of the motor and this energy is dissipated in a current forming an arc or spark at the commutator brushes. This current through the motor windings is represented by the portion B of the curve of Fig. 2b. This current, it will be seen, produces a negative torque on the motor armature 13, that is, one in a direction opposite to rotation and, therefore, effects a dynamic braking of the motor. If it be assumed that the reluctance of the magnetic core 10 and armature 13 of the motor is negligible compared to that of the air gap, which is approximately realized in practice, the current building up in the motor windings during the interval from zero to 90 degrees may be represented by the following equation:

$$I = \frac{E}{\omega k + R}\left[1 - \left(\frac{L_a}{L_a + k\theta}\right)^{\frac{R+\omega k}{\omega k}}\right] + I_a\left(\frac{L_a}{L_a + k\theta}\right)^{\frac{R+\omega k}{\omega k}} \quad (1)$$

where $I$ = motor current in amperes;
$E$ = supply voltage in volts;
$L_a$ = inductance of motor windings at position of closing of motor circuit;
$k$ = rate of change of winding inductance in henries per radian;
$\omega$ = angular velocity in radians per second;
$R$ = resistance of motor windings;
$I_a$ = coil current at closing of motor circuit;
$\theta$ = angular displacement from the position of closing motor circuit.

A variable permeance motor having the operating characteristics just described has a number of disadvantages, among which may be mentioned the following: The substantial negative torque developed by the current represented by the portion B of the curve of Fig. 2b, which is due to the dissipation of the energy stored in the magnetic field and occurs twice during each complete cycle of rotation, substantially reduces the power output of the motor and its operating efficiency. The duration and the rate of variation of this current resulting from the dissipation of the motor field depend, among other factors, upon the conditions of the contacts or brushes of the commutator, which are extremely variable, resulting in erratic or unstable operation under certain conditions. Further, the dissipation of such large amounts of energy at the commutator contacts or brushes results in a destruction of the brushes in a relatively short time, particularly for motors having any substantial power output. A further disadvantage is that the relatively slow build-up of motor current in accordance with Equation 1 above, as shown by curve A of Fig. 2b, materially reduces the available power output of the motor, since the average current during the working portion of the cycle is substantially less than the maximum.

If now we add a condenser 22 across the commutator brushes 20 and/or a condenser 23 directly across the motor windings 14 and 15, as shown in Figs. 1 and 2a, the coil current characteristic is modified from that shown by the curve A, B of Fig. 2b to that shown by the curve A', B' of Fig. 2c. This may be explained as follows: the addition of either or both of these condensers, if sufficiently large, is effective to divert the current to the motor field into stored electrostatic energy in the condenser. The coil windings and the condenser thus comprise an ordinary oscillatory circuit and, when the current is interrupted at the brushes 20, the system goes into oscillation, as shown by the curve B' of Fig. 2c, during the interval from 90 degrees to 180 degrees. Thus, the energy which normally produces the spark at the interrupting of the motor circuit is dissipated as a damped oscillating current and further causes a severe spark at the time of the closing of the motor circuit through the brushes 20. The addition of these condensers, or either of them, does not increase the efficiency of the motor, but, in fact, tends to decrease its efficiency since not only is the energy stored in the magnetic field dissipated in a parasitic oscillation upon interrupting of the motor circuit, but an additional amount of energy is dissipated in the spark at the brushes when the motor circuit is closed.

A further characteristic of the motor described above and one which will be found useful in the explanation which follows is shown in Fig. 2d, which represents the variation in inductance of the motor windings relative to the angular displacement of the motor armature from the position of minimum permeance shown in dotted lines in Fig. 1. With the assumption given above, namely, that the reluctance of the iron core of the motor is negligible compared to that of the air gap, the inductance is directly proportional to the angle of overlap between the salient poles of the motor core and armature.

All of the matter described above relates to the motors of the prior art. Returning now to Fig. 1 of the drawings and considering the addition of a resistor 24 across the brushes 20 of the circuit interrupter 17 and the shifting of the leading brush 20 to the position shown in dotted lines, so that the motor circuit is closed only during 60 degree intervals of rotation, the characteristics of the motor may best be described with reference to the simplified equivalent circuit diagram of Fig. 3a and the graph of Fig. 3b showing the motor current characteristics. The operation may be best explained by reference to Fig. 3b showing one complete cycle of motor current that is, 360 electrical degrees, corresponding to one half cycle of rotation that is, 180 mechanical degrees. Assuming that the motor current has an initial value $a$ at the instant that the armature reaches the position of minimum permeance shown in dotted lines in Fig. 1, which may be termed the admission point, as, for example, by closing the motor circuit an interval before the armature reaches this position, the current is represented by the horizontal line A to the point $c$ at which the motor circuit is interrupted at the brushes 20, which point may be termed the cutoff point. However, the current is constant during the interval A only in case it reaches the value $a$ at the beginning of the interval and the motional impedance $(\omega k + R)$, a term further defined hereinafter, is constant, which is the case if the air gap is uniform and the reluctance of the magnetic core negligible.

During this interval, which may be termed the working stroke, a positive mechanical torque is exerted upon the motor armature to produce useful power output. After the motor circuit is interrupted at the cutoff point $c$ by the opening of the circuit at the brushes 20, the current generated by the dissipation of the motor field energy is diverted through the resistor 24 in parallel with the commutator 17 and decreases along the curve C of Fig. 3b to the point $e$ corresponding to the position of maximum permeance shown in full lines in Fig. 1, which may be termed the exhaust point. During this interval the current representing the dissipation of the motor field energy does useful work rather than being merely dissipated in destructive action at the motor commutator. From the exhaust point $e$ to the point $p$, rotation of the motor is continued by its acquired momentum. During this interval, which may be termed the exhaust interval, two actions are taking place: first, the energy stored in the motor field tends to be dissipated in the resistance of the circuit which would, of itself, tend to decrease the motor current; however, at the same time the inductance of the motor winding is decreasing as the armature approaches the position of minimum permeance, thus tending to increase the motor current in proportion to the decrease in the motor inductance. Further, the momentum of the motor armature tends to produce a regenerating action aiding and maintaining the current through the motor winding. At the point $p$ the motor circuit is closed by the commutator 17 and the current through the winding builds up, as indicated by the dashed line curve P to the admission point $a$. The build-up of the current as represented by the curve P is not logarithmic, as indicated by the curve A of Fig. 2b, since, during this interval, the inductance of the motor winding is rapidly decreasing at such a rate as to more than compensate for the normal gradually decreasing rate of rise of the motor current.

It has been found that the efficiency of the motor may be somewhat increased by advancing the point $p$ to $p'$, as by shifting the trailing brush 20 of the commutator 17, which allows the current in the motor to build up according to the curve P' to a value considerably greater than the static equilibrium value in the position of maximum permeance. Assuming that the cycle is repeated, the motor current at the beginning of the admission or working stroke A' then has a value $a'$, from which it is seen that the average value over the working stroke is considerably higher. The added increment of positive torque during the working stroke A' is considerably greater than the negative torque added during the preadmission interval P'.

In the above description of the motor of the invention, the various portions of the operating cycle have been described in terms analogous to those in the operation of a reciprocating steam engine since, in fact, the underlying principles are similar. The admission period A corresponds to the admission of steam to the engine cylinder; the point $c$ corresponds to the cutoff point; the portion C to the expansion; the point $e$ to the opening of the exhaust; the interval D to the exhaust stroke; the point $p'$ to the point of preadmission or precompression; and the portion P' to the preadmission or precompression stroke. As in the conventional steam engine, in accordance with the present invention the cutoff point $c$ is advanced from the 90 degree point or exhaust point $e$ by a substantial phase interval of the order of 30 degrees, thereby materially improving the efficiency of the motor. Further, by adjustment of the cutoff point, as by adjusting the leading brush 20 of commutator 17 as indicated by the arrows, the power input and, therefore, the speed of the motor may be readily controlled. Further, by advancing the point of cutoff from the point $e$ to the point $c$, the main motor circuit is broken by the brushes 20 at a point in the cycle indicated by the point $c$ of Fig. 2d at which the inductance of the motor winding and its stored energy are substantially less than its maximum value, thus reducing the duty on the commutator 17. If it were possible to make the maximum permeance of the motor infinite, as by reducing the air gap to zero, all of the stored energy of the motor field would be converted into mechanical work during the portion of the cycle C and thus maximum efficiency would be realized. This is, of course, an ideal relationship which can only be approximated in practice. Nevertheless, by making the air gap a minimum and by utilizing the invention as just described, the efficiency of the motor may be very considerably increased.

It has been found that the value of the resistance of resistor 24 should be within the limits of two to six times, and preferably of the order of three times, the motional impedance of the motor. The motional impedance of the motor may be represented by the expression $\omega k + R$, in which the symbols have the same significance given above with respect to Equation 1. The term $\omega k$ is analogous to the counterelectromotive force of a wound-rotor electric motor and has the dimension of ohms. The motional impedance might be termed also the internal or dynamic impedance as contrasted with the impedance of the external motor circuit.

The variation of the motor current during the expansion period C may be expressed by the following equation:

$$I = \frac{E}{\omega k + R}\left[1 - \left(\frac{L_c}{L_c + k\theta}\right)^{\frac{R+\omega k}{\omega k}}\right] + I_c\left(\frac{L_c}{L_c + k\theta}\right)^{\frac{R+\omega k}{\omega k}} \quad (2)$$

where
$I_c$ = motor current at cutoff point $c$;
$L_c$ = motor winding inductance at cutoff point $c$;
$R$ = total circuit resistance including that of external resistor 24;
$\theta$ = angular displacement from position of motor armature at beginning of portion of cycle in question.

The equation for the variation of motor current during the exhaust period D may be expressed as follows:

$$I = \frac{E}{\omega k - R}\left[\left(\frac{L_e - k\theta}{L_e}\right)^{\frac{R-\omega k}{\omega k}} - 1\right] + I_e\left(\frac{L_e - k\theta}{L_e}\right)^{\frac{R-\omega k}{\omega k}} \quad (3)$$

where
$I_e$ = motor current at exhaust point $e$;
$L_e$ = motor winding inductance at exhaust point $e$;
$R$ = total circuit resistance including that of external resistor 24.

The equation for the variation of motor current during the preadmission or precompression period P' may be expressed as follows:

$$I = \frac{E}{\omega k - R}\left[\left(\frac{L_p - k\theta}{L_p}\right)^{\frac{R-\omega k}{\omega k}} - 1\right] + I_p\left(\frac{L_p - k\theta}{L_p}\right)^{\frac{R-\omega k}{\omega k}} \quad (4)$$

where
$I_p$ = motor current at preadmission point $p$;
$L_p$ = motor winding inductance at preadmission point $p$;
$R$ = resistance of motor winding only.

A modification of the arrangement of Fig. 3a is shown schematically in Fig. 4a, in which the resistor 24 connected across the contacts of Fig. 3a is replaced by a resistor 25 connected directly across the motor windings. The general operating principles are the same and the motor current characteristic is shown in Fig. 4b. However, in this arrangement, due to the fact that the motor current decreases to a lower value during the exhaust period D, it has been found that the efficiency of the motor is somewhat improved as the preadmission or precompression period is delayed from the normal point $p$ to the point $p'$, so that there is what might be termed "under compression" along a curve $P'$ and the admission commences from the point $a$, considerably below what might be termed the normal admission point $a$ on the dotted-line curve A of Fig. 4b, which corresponds to the dotted-line characteristic cycle of Fig. 3b.

The variation of the motor current in the last-described arrangement during the expansion period C is represented by the equation:

$$I = \frac{I_c}{\left(\frac{L_c + k\theta}{L_c}\right)^{\frac{R+\omega k}{\omega k}}} \quad (5)$$

where R is the coil circuit resistance including 25. The corresponding characteristic during the exhaust period D is given by the equation:

$$I = I_e \left(\frac{L_e}{L_e - k\theta}\right)^{\frac{\omega k - R}{\omega k}} \quad (6)$$

where R is the same as in Equation 5. The characteristic of the motor current during the compression period $P'$ is given by the Equation 4, supra, since during compression the circuit of Fig. 4a is identical to that of Fig. 3a.

In considering the motor current characteristics, as shown in Figs. 3b and 4b, an impression may be obtained that the magnitude of the negative torque during the exhaust periods D and the preadmission periods $P'$ is very substantial relative to the positive torques developed during the admission periods A' and the expansion periods C. However, it must be remember that these graphs are in terms of current, while the torque and power output of the motor are functions of the square of the current so that the graphs greatly exaggerate the relative magnitudes of the negative torques. With this in mind, it is also apparent that there is some advantage, from an efficiency standpoint, in the arrangement of Fig. 3a, in which the discharge resistor is connected across the interrupter contacts, over that of Fig. 4a, in which it is connected across the motor winding, since the average value of the square of the current over the cycle is substantially greater in the case of the circuit of Fig. 3a, as shown by the curve of Fig. 3b. This may be accounted for, in part, by the fact that the motor current during the exhaust period D does not fall to such a low value, so that it is more practical to obtain "over compression" and thereby substantially increase the power output of the motor.

In Fig. 5a there is shown diagrammatically a modification of the circuit of Fig. 4a in which the resistor 25 across the motor windings is replaced by a resistor 26 in series with a unilaterally conductive device, such as a diode rectifier 27, connected with such polarity as to be conductive to the discharge current of the motor windings but nonconductive with respect to the supply circuit 21. In this case there is provided an auxiliary commutator, shown for the sake of clarity in two sections 28 and 28a, each similar to the commutator 17 except that the trailing brush is adjustable rather than the leading brush, as in commutator 17. The section 28 comprises two conductive segments 29 mounted on an insulated ring, each segment covering approximately 90 degrees but displaced in phase approximately 90 degrees with respect to the segments 19 of commutator 17. The commutator section 28 is provided with a pair of brushes 31, the fixed leading brush being displaced 180 degrees in phase with respect to the fixed trailing brush 20 of commutator 17, while the trailing brush 31 is normally displaced approximately 60 degrees from the leading brush, so that its associated circuit is completed for 30 degree intervals during each cycle. The commutator section 28a is similar to the section 28 and corresponding elements are identified by similar reference numerals with an added subscript $a$. The fixed leading brush 31a has the same phase position as the corresponding brush 31 but the trailing brush is normally displaced approximately 30 degrees from the leading brush, so that its associated circuit is completed for 60 degree intervals during each cycle. The conductive segments 29a are displaced 90 degrees with respect to the segments 29, that is, they are in phase with the segments 19 of commutator 17. The auxiliary commutator 28, 28a is connected to short-circuit the resistor 26 for purposes to be described hereinafter. The leading brush 20 of commutator 17 and the trailing brushes 31, 31a of commutator 28, 28a are adjustable, as indicated, and are connected for simultaneous control by a unicontrol mechanism indicated in dotted lines at U. A small arc suppressing condenser 22 may be connected across the brushes of the commutator 17 and a similar condenser 32 connected across the rectifier 27.

The general principles of operation of the apparatus of Fig. 5a are similar to those described above, with the exception that the resistor 26 is short-circuited during the expansion period C and during the precompression period P. The commutators 17 and 28, 28a are illustrated in their relative positions corresponding to the admission point $a$ of Fig. 5b. The effect of the short-circuiting of resistor 26 is substantially to improve the efficiency of the motor from a number of standpoints. In the first place, during the expansion C, the commutator section 28a short-circuits the resistor 26 so that a minimum of resistance is included in the motor circuit, corresponding to a minimum dissipation of stored energy. The increased power output during the expansion stroke C permits advancing the optimum cutoff point $c$ from the angle of approximately 60 degrees, as indicated in Figs. 3b and 4b, to approximately 30 degrees, as shown in Fig. 5b. During the exhaust period D, the resistor 26 is included in the motor circuit and its value is selected to control the rate of dissipation of the energy stored in the magnetic field and the rate of change of the motor winding current to the proper value for optimum compression. During the compression period P, the resistor 26 is again short-circuited by the commutator section 28 to aid in rapidly building up the current to the admission value. The ideal relation is that the value of resistor 26 is very high or infinite so that the exhaust is completed in a very short time, allowing a relatively long period for compression. Under these conditions, the current rises, during the compression interval, from such a low value and so slowly during the initial portion of the interval that the integrated value of the negative torque during the exhaust and compression intervals is reduced to a minimum. As a practical matter, the exhaust should be carried out as rapidly as possible by increasing the value of resistor 26. The limitation on the value of resistor 26 is the value of voltage developed across it by the exhaust current which will just initiate arcing. It has been found that from 20 degrees to 30 degrees exhaust interval is a practical compromise.

The inclusion of the diode rectifier 27 in series with the resistor 26 prevents a drain from the supply circuit through the resistor during the working stroke when the brushes of the commutator 17 operate to close the motor circuit. The addition of the condenser 32 across the rectifier 27 is effective to carry the initial surge of current at the cutoff point $c$ when the motor circuit is interrupted, in case the rectifier 27 should require any appreciable time for developing its rated current, which is particularly the case if the rectifier is a gas or vapor filled tube having an appreciable ionization time.

Adjustment of the unicontrol mechanism U accomplishes three things: (1) adjustment of the cutoff point $c$ by commutator 17 to control the power input to the motor and, hence, for a given load torque, the speed of the motor; (2) adjustment of the trailing brush 31a to synchronize the short-circuiting of resistor 26 during expansion with the adjustment of the cutoff point $c$; and (3) adjustment of the trailing brush 31 to adjust the compression point $p$ to compensate for variations in the motor current at the compression point $p$ with adjustment of the cutoff point $c$ and thereby procure a constant value of admission current at the point $a$. In certain cases the mechanism U may include suitable cams to provide the proper rates of relative adjustment of the brushes 20, 31, and 31a.

The variation of the motor current of the arrangement of Fig. 5a during the expansion period may be expressed by the following equation:

$$I = \frac{I_c + \frac{E_R}{\omega k + R}}{\left(\frac{L_c + k\theta}{L_c}\right)^{\frac{R+\omega k}{\omega k}}} - \frac{E_R}{\omega k + R} \quad (7)$$

where $E_R$=voltage drop across rectifier 27.

The similar characteristic during the exhaust period P may be expressed by the following equation:

$$I = \left(I_e + \frac{E_R}{R - \omega k}\right)\left(\frac{L_e}{L_c - k\theta}\right)^{\frac{\omega k - R}{\omega k}} - \frac{E_R}{R - \omega k} \quad (8)$$

where R=total winding circuit resistance including that of external resistor 26.

The motor current characteristic during the compression period is expressed by the preceding equation by substituting for the circuit characteristics at point $e$ those at point $p$ and utilizing as the value of R the resistance of the motor winding circuit exclusive of the resistor 26.

Fig. 5c represents a circuit which is generally equivalent to that of Fig. 5a just described and in which the rectifier 27 and series-connected resistor 26 are replaced by series-connected resistors 33 and 34, the latter of which is intermittently short-circuited by the commutator 28. The value of the resistor 33 may be selected at some suitably small value for optimum control of the current in the motor winding during the expansion and compression intervals. If desired, an arc reducing condenser 35 may be connected across the brushes of the commutator 28. The operation of the circuit of Fig. 5c is similar to that of Fig. 5a and similar equations apply, the only difference being that in this case there is a drain from the current supply circuit during the admission period or working stroke A.

In Fig. 5d is shown still a further modification which combines certain of the features of Figs. 3a and 5a. In this case, the resistor 24 of Fig. 3a connected across the commutator 17 is replaced by two series-connected resistors 36 and 37, the latter of which is periodically short-circuited by the auxiliary commutator 28. If desired, an arc reducing condenser 38 may be connected across the commutator 28. As in the previous instance, the resistor 37 is intermittently short-circuited during the expansion interval C and the compression interval P and may be included in the circuit during the exhaust period D and the admission period A. The value of resistor 36 is selected primarily to control the motor current during the expansion and compression intervals, while the value of the resistor 37 is selected primarily to control the motor current during the exhaust interval.

While the values of the resistors 24, 25, and 26 are not critical, there are certain limits to the values of these resistors which, as has been shown both experimentally and mathematically, impart desirable operating characteristics to the motor. For example, referring to the motor represented by Figs. 3a and 3b, it has been found that best results are obtained if the current during the exhaust period D is maintained approximately constant. It can be shown, and it has been demonstrated, that under such condition the value of the resistor R is equal to $n\omega k$ where $$\frac{I_e}{I_c} = \frac{1}{n-1}$$

where $n$=any number greater than 1
$I_c$=value of the motor current at cutoff $c$
$I_e$=value of the motor current at the exhaust point $e$.

In general, the motor current at the exhaust point $e$ is from one-half to one-fifth its value at cutoff $I_c$, so that R will vary from three to six times $(\omega k + R)$ which, as stated above, may be considered the dynamic impedance of the motor.

In the motor represented by Figs. 4a and 4b, it is desirable that the motor current be reduced to approximately zero at the point of compression $p$ to procure the best results. This value will, of course, depend upon the point of cutoff which, if this is utilized to adjust the speed of the motor, may vary within reasonable limits. It has been determined experimentally, however, that the value of the resistor 25 is preferably between three and six times the motional impedance $(\omega k + R)$ and is preferably of the order of four times $(\omega k + R)$.

The explanation of the operation of the various modified forms of the invention has been on the basis of a direct current supply circuit. However, it has been determined that, except for the embodiments of the invention utilizing a rectifier in the discharge path, as in Fig. 5a, similar operation takes place on alternating current circuits, in which case, if the normal speed of the motor approximates the synchronous speed as determined by the alternating current supply frequency, the motor tends to run synchronously. This is particularly true of a motor embodying the circuit of Fig. 3a. It has also been determined that the optimum value of the resistor across the motor commutator or across the motor windings is of the same order of magnitude for alternating current operation as for direct current operation.

While it will be readily apparent that variable permeance motors embodying the present invention may be applied to a wide variety of types and sizes of motors, there follow specifications of a particular fractional horsepower motor embodying the invention as illustrated in Fig. 5a, which has operated very satisfactorily:

| | |
|---|---|
| Motor core | 4½ x 3¼ inches |
| Stack height of core laminations | 2½ inches |
| Air gap | 0.0231 inch |
| Diameter of cylindrical portion of armature | 1⅜ inch |
| Coil windows | 1¼ inch wide |
| Motor windows | 2 windings, 465 turns No. 22 wire, connected in parallel |
| Rectifier 27 | 3 type 83 V tubes in parallel |
| Resistor 26 | 130 ohms |
| Motor winding resistance (in parallel) | 3.9 ohms |

This motor was found to operate satisfactorily with the following commutator adjustments:

Admission period 30 degrees no lead angle
Expansion—60 degrees
Exhaust—20 degrees
Compression—70 degrees.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter including in said circuit, means actuated by relative rotation between said members for periodically closing said interrupter and for opening said interrupter a substantial interval before said members reach each relative position of maximum permeance when relatively rotating toward said position of maximum permeance, and means for providing a discharge path for said winding at least during said interval whereby at least a portion of the energy which is stored in the magnetic field of said winding when said circuit is opened is utilized in developing mechanical output.

2. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter near each relative position of minimum permeance and for opening said interrupter a substantial interval before said members reach each relative position of maximum permeance when relatively rotating toward said position of maximum permeance, and means for providing a discharge path for said winding at least during said interval whereby at least a portion of the energy which is stored in the magnetic field of said winding when said circuit is opened is utilized in developing mechanical output.

3. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, means for providing a discharge path for said winding at least during said interval whereby at least a portion of the energy which is stored in the magnetic field of said winding when said circuit is opened is utilized in developing mechanical output, and means for adjusting said interval to control the speed of the motor.

4. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and means for providing a discharge path for said winding at least during said interval including resistance means for determining the rate of collapse of the magnetic field when said interrupter is opened.

5. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, capacitance means connected across said interrupter, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and means for providing a discharge path for said winding at least during said interval including resistance means for determining the rate of collapse of the magnetic field when said interrupter is opened.

6. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and a discharge path for said winding including resistance means for determining the rate of collapse of the magnetic field when said interrupter is opened, said resistance means being of such value that the current through said winding is reduced nearly to zero near each point in the cycle at which said interrupter is closed.

7. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and a discharge path for said winding including resistance means for determining the rate of collapse of the magnetic field when said interrupter is opened, said resistance means having such value that the current through said winding is held substantially constant between each point of maximum permeance and the succeeding point at which said interrupter is closed.

8. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and a discharge path for said winding including resistance means for determining the rate of collapse of the magnetic field when said interrupter is opened, said resistance means having a value of from one to ten times the motional impedance of the motor.

9. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and a discharge path for said winding including resistance means for determining the rate of collapse of the magnetic field when said interrupter is opened, said resistance means having a value of the order of three times the motional impedance of the motor.

10. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, capacitance means connected across said interrupter, said capacitance means having a value so proportioned relative to the impedance constants of the motor and its circuit as to substantially avoid oscillation, means actuated by relative rotation between said members for periodically closing said interrupter and for opening said interrupter a substantial interval before said members reach each relative position of maximum permeance when relatively rotating toward said position of maximum permeance, whereby at least a portion of the energy which is stored in the magnetic field of said winding when said circuit is opened is utilized in developing mechanical output, and a discharge path for said winding including resistance means for determining the rate of collapse of the magnetic field when said interrupter is opened.

11. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, and a discharge path for said winding including a unilaterally conductive device connected with such polarity as to conduct the current generated by the collapse of the magnetic field of said winding, whereby said current is utilized in developing mechanical output.

12. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, and a discharge path for said winding including a unilaterally conductive device connected across said winding with such polarity as to conduct the current generated by the collapse of the magnetic field of said winding, whereby said current is utilized in developing mechanical output.

13. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically opening and closing said interrupter, a discharge path for said winding, and means actuated by the relative rotation of said elements for reducing the resistance of said discharge path an interval before each closing of said interrupter, thereby accelerating the building up of current through said winding to its maximum value.

14. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, a discharge path for said winding, means actuated by the relative rotation of said elements for reducing the resistance of said discharge path a second interval before each closing of said interrupter, thereby accelerating the building up of current through said winding to its maximum value, means for adjusting said first interval to control the speed of the motor, means for adjusting said second interval for controlling the maximum value to which said current through said winding builds up, and unicontrol means for simultaneously actuating both of said adjusting means.

15. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically opening and closing said interrupter, a discharge path for said winding, resistance means in said discharge path, and means actuated by the relative rotation of said elements for short-circuiting at least a portion of said resistance means an interval before each closing of said interrupter, thereby accelerating the building up of current through said winding to its maximum value.

16. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically opening and closing said interrupter, a discharge path for said winding, a unilaterally conductive device and a resistance element connected in series in said discharge path, and means actuated by the relative rotation of said elements for short-circuiting said resistance element an interval before each closing of said interrupter, thereby accelerating the building up of current through said winding to its maximum value.

17. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically opening and closing said interrupter, a discharge path for said winding, a unilaterally conductive device and a resistance element connected in series in said discharge path, means actuated by the relative rotation of said elements for short-circuiting said resistance element an interval before each closing of said interrupter, thereby accelerating the building up of current through said winding to its maximum value, and capacitance means effectively in parallel with said unilaterally conductive device.

18. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, a discharge path for said winding, and means actuated by the relative rotation of said elements for reducing the resistance of said discharge path an interval before each closing of said interrupter, thereby accelerating the building up of current through said winding to its maximum value.

19. A variable permeance electric motor comprising a salient pole magnetic core member provided with an exciting winding, an energizing circuit for said winding, an associated salient pole magnetc armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, a discharge path for said winding, and means actuated by the relative rotation of said elements for increasing the resistance of said discharge path near said point of maximum permeance, whereby the dissipation of energy stored in the magnetic field of said winding is accelerated.

20. A variable permeance electric motor comprising a salient pole magnetic core member provided with an exciting winding, an energizing circuit for said winding, an associated salient pole magnetc armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, a discharge path for said winding, and means actuated by the relative rotation of said elements for increasing the resistance of said discharge path near said point of maximum permeance, whereby the dissipation of energy stored in the magnetic field of said winding is accelerated, and for redusing the resistance of said discharge path a second interval before each closing of said interrupter, thereby accelerating the building up of current through said winding to its maximum value.

21. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically closing said interrupter and for opening said interrupter a substantial interval before said members reach each relative position of maximum permeance when relatively rotating toward said position of maximum permeance, a discharge path for said winding, a unilaterally conductive device and a resistance element connected in series in said discharge path, a second circuit interrupter connected across said resistance element, and means actuated by the relative rotation of said elements for opening said second interrupter near said point of maximum permeance, whereby the dissipation of energy stored in the magnetic field of said winding is accelerated, and for closing said second interrupter a second interval before each closing of said first interrupter, thereby accelerating the building up of current through said winding to its maximum value.

22. A variable permeance electric motor comprising a salient pole magnetic core member provided with an exciting winding, an energizing circuit for said winding, an associated salient pole magnetic armature member, said members being relatively rotatable and having relative positions of maximum and minimum permeance, a circuit interrupter included in said circuit, means actuated by relative rotation between said members for periodically opening and closing said interrupter at predetermined points in the cycle of rotation, and a resistor connected in parallel to said circuit interrupter at least during the portion of each cycle said circuit interrupter is open, to increase the average torque and power of said motor.

23. A variable permeance electric motor comprising a salient pole magnetic core member provided with an exciting winding, an alternating current energizing circuit for said winding, an associated salient pole magnetic armature member, said members being relatively rotatable and having relative positions of maximum and minimum permeance, a circuit interrupter included in said circuit, means actuated by relative rotation between said members for periodically opening and closing said interrupter at predetermined points in the cycle of rotation, and a resistor connected in parallel to said circuit interrupter at least during the portion of each cycle said circuit interrupter is open, whereby said motor tends to run at a synchronous speed determined by the frequency of said energizing circuit and the number of poles of said armature member.

HERBERT C. ROTERS.